US011270539B2

(12) United States Patent
Mathur

(10) Patent No.: US 11,270,539 B2
(45) Date of Patent: Mar. 8, 2022

(54) KEYLESS ENTRY UTILIZING SET-BACK BOX

(71) Applicant: Sling Media L.L.C., Foster City, CA (US)

(72) Inventor: Mudit Mathur, Milpitas, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 16/853,483

(22) Filed: Apr. 20, 2020

(65) Prior Publication Data

US 2021/0327184 A1 Oct. 21, 2021

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 1/02*** | (2006.01) |
| ***H04B 3/00*** | (2006.01) |
| ***H04Q 1/00*** | (2006.01) |
| ***H04Q 9/00*** | (2006.01) |
| ***G07C 9/00*** | (2020.01) |
| ***G07C 9/38*** | (2020.01) |

(52) U.S. Cl.
CPC ........... *G07C 9/00904* (2013.01); *G07C 9/38* (2020.01)

(58) Field of Classification Search
CPC .............................. G07C 9/00904; G07C 9/38
USPC ........................................................ 340/5.64
See application file for complete search history.

(56) References Cited

U.S. PATENT DOCUMENTS

| | | | | |
|---|---|---|---|---|
| 9,483,887 | B1 * | 11/2016 | Soleimani | G07C 9/00571 |
| 2012/0154115 | A1 * | 6/2012 | Herrala | G07C 9/28 340/5.64 |
| 2017/0140592 | A1 * | 5/2017 | Pluss | H04L 63/166 |
| 2021/0120299 | A1 * | 4/2021 | Arling | H04N 21/42224 |

OTHER PUBLICATIONS

International Search Report and the Written Opinion of the International Searching Authority for PCT/US2021/027999 dated May 11, 2021, 9 pages.

* cited by examiner

*Primary Examiner* — Tanmay K Shah
(74) *Attorney, Agent, or Firm* — Perkins Coie LLP

(57) ABSTRACT

Techniques are described for keyless entry to a structure (e.g., hotel room) utilizing a set-back box. Registrants (e.g., hotel guest) may scan a barcode from their mobile device to check-in to the structure. Upon scanning the barcode or by other means, a mobile device identifier (e.g., a Bluetooth low-energy address (BLE)) is registered and associated with the checked-in structure. Receiving the registered mobile device identifier, the backend server pushes such to the set-back box associated with (e.g., resides in) the checked-in structure. The set-back box is enabled (e.g., BLE enabled) to actively scan addresses of nearby mobile devices. When the registered mobile device identifier is detected within a predetermined signal strength range (e.g., by using received signal strength indicator (RSSI) levels), the set-back box transmits a command to a smart lock (e.g., via BLE or Wifi or other radio) or to a lock controlling backend processor, to open the lock.

17 Claims, 7 Drawing Sheets

KEYLESS ENTRY UTILIZING SET-BACK BOX

BACKGROUND

Currently, technology exists today that enables an individual to check-in to their hotel, or even re-enter their country from traveling abroad, by having a specific barcode, that had been preloaded onto their mobile device, scanned by an appropriate scanner. However, to enter the hotel room, the individual still is required to perform an action actively, such as for example, use their physical, magnetic key.

DETAILED DESCRIPTION

Techniques are described for keyless entry to a structure (e.g., hotel room) utilizing a set-back box or utilizing a set-top box. For purposes of understanding the innovation and not obfuscating, Applicant hereinbelow refers to set-back box, as illustrative. Registrants (e.g., hotel guest) may scan a barcode from their mobile device to check-in to the structure. Upon scanning the barcode or by other means, a mobile device identifier (e.g., a Bluetooth low-energy (BLE) address) is registered and associated with the checked-in structure. Receiving the registered mobile device identifier, the backend server pushes such to the set-back box associated with (e.g., resides in) the checked-in structure. The set-back box is enabled (e.g., BLE enabled) to actively scan addresses of nearby mobile devices. When the registered mobile device identifier is detected within a predetermined signal strength range (e.g., by using received signal strength indicator (RSSI) levels), the set-back box transmits a command to a smart lock (e.g., via BLE or Wifi or other radio) or to a lock controlling backend processor, to open the lock.

Figure 1:
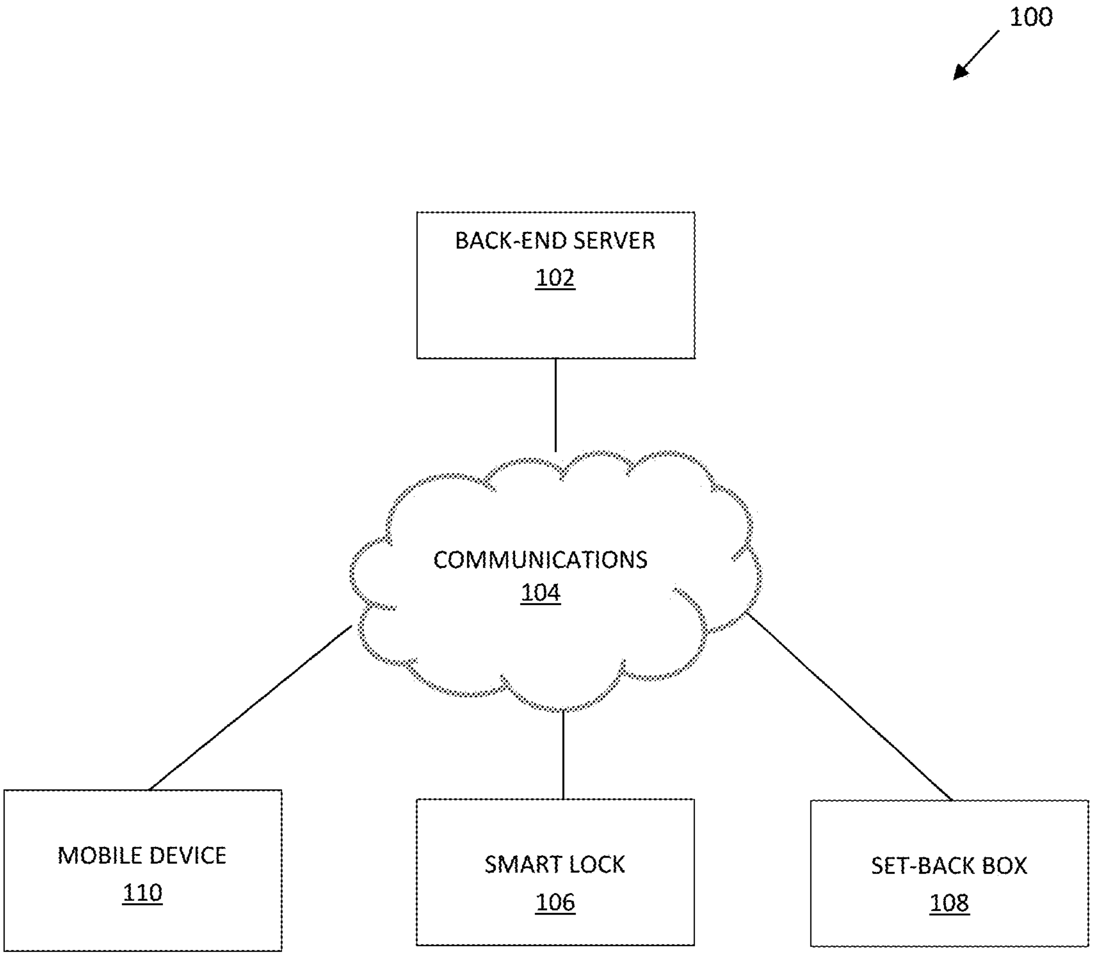
FIG. 1 is a block diagram of a system for keyless entry, utilizing a set-back box, consistent with various embodiments.

An embodiment may be understood with reference to FIG. 1, a high-level block diagram of a system 100 for keyless entry, utilizing a set-back box. Typically, an individual, such as a hotel guest, may check-in to the hotel and be assigned a room by using their mobile device. Thus, in an embodiment, a mobile device 110 may be used by a user to enter into and complete a check-in process with a back-end server 102 that may be provided by the enterprise, such as the hotel. For instance and in an embodiment, the Bluetooth low energy (BLE) address of mobile device 110 may be scanned by a scanner provided by the enterprise, that is communicably connected with the back-end server 102 via a communication component or module 104. Then, after or during the check-in process, the back-end server 102 pushes the identifier of the mobile device 110, through communications component 104, to a set-back box 108, which was associated with user, after or during the check-in process. For example, back-end server 102 may push a whitelist of many BLE addresses corresponding to many mobile devices to multiple set-back boxes, including set-back box 108. Set-back box 108 is configured to scan, via communications component 104, for mobile identifiers that are in a predetermined, proximate distance range. Once set-back box 108 receives the transmitted identifier of mobile device 110, set-back box 108 continuously scans for such identifier, along with other devices that are within range. Further, set-back box 108 is configured to determine, using the identifier of mobile device 110, when mobile device 110 is within the predetermined range of distance, via communications component 104. When the determination is made, set-back box 108 sends out, via communications component 104, a command to unlock the lock on smart lock 106. In one embodiment, set-back box may send, via communications component 104, the command to back-end server 102 that is configured to transmit, via communications component, an unlock command to smart lock 108, upon receipt of such command from set-back box 108. In another embodiment, set-back box may be configured to transmit (e.g., wirelessly via communications component 104) an unlock command directly to smart lock 106, when the determination is made. Then, by the time the user in possession of mobile device 110 approaches the door or other structure hosting the smart lock 106, smart lock 106 has unlocked such door or structure and the user may enter the structure without having to perform any action pertaining to unlocking the door.

In an embodiment, communications component 104, as shown, is a logical representation of how each element (102, 110, 106, 108) may be communicably connected with another element (102, 110, 106, 108). The communications component 140 represents one or more mechanisms for delivering commands and information between one or more elements of back-end server 102, mobile device 110, smart lock 106, and set-back box 108 and one or more elements of back-end server 102, mobile device 110, smart lock 106, and set-back box 108. Accordingly, the communications component 104 may be one or more of various wired or wireless communication mechanisms, including any desired combination of wired, e.g., cable, fiber, etc., and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

In addition to the one or more communications components 104 mechanisms discussed above, communications component 104 may represent one or more wired or wireless direct connections. Direct connections may include e.g., Bluetooth, Universal Serial Bus (USB), high-definition multimedia interfaces (HDMI), and custom serial interfaces.

In an embodiment, smart lock 106 may be configured to detect and measure the signal strength of a device configured for such (e.g., mobile device 110) and be further configured to wirelessly communicate with a set-back box (e.g., set-back box 108) in the structure (e.g., room), for example to transmit a notification that such device is in proximity of the set-back box. In another embodiment, the set-back box (e.g., set-back box 108) may be configured to measure the signal strength (e.g., of a mobile device) and, subsequently, wirelessly communicate such measurement to the smart lock (e.g., smart lock 106). The smart lock 106 then may unlock and/or perform other configured operations.

It should be appreciated that the check-in process may be by other ways, however, in each case, the identifier of the mobile device 110, as well as other metadata about the user (e.g., name, driver's license number, credit card information, etc.) are captured and stored, for example, on the capturing device or the back-end server 102. Regardless of place of storage, the back-end server 102 has access to the mobile device identifier of mobile device 110.

In an embodiment, the identifier may be communicated to the set-back box 108 via an application, such as an application of the hotel, for example executed by the back-end server 102. Such application may send out a configurable Universally Unique Identifier (UUID), for example as defined in RFC 4122, to correspond to a mobile device of the user. The UUID is mapped to the identifier of the mobile device. The set-back box 108 is configured to communicate with such application, e.g., by using appropriate APIs.

In an embodiment, the mobile device identifier is transmitted to or from mobile device 110, back-end server 102, set-back box 108, or smart lock 106 in encrypted format. Each of mobile device 110, back-end server 102, set-back box 108, or smart lock 106 is configured to encrypt or decrypt the mobile device identifier. Further, the mobile device identifier may be afforded the same or similar privacy laws and is transmitted in the acceptable way of passing the user information.

In an embodiment, the back-end server 102 is communicably connected to the set-back box 108, which are both part of the enterprise's property management system (PMS). Thus, during or after the check-in process, the back-end server 102 associates the set-back box 108 with the user of the mobile device 110 (e.g., the hotel guest, a user profile, or a hotel guest profile).

Figure 2:
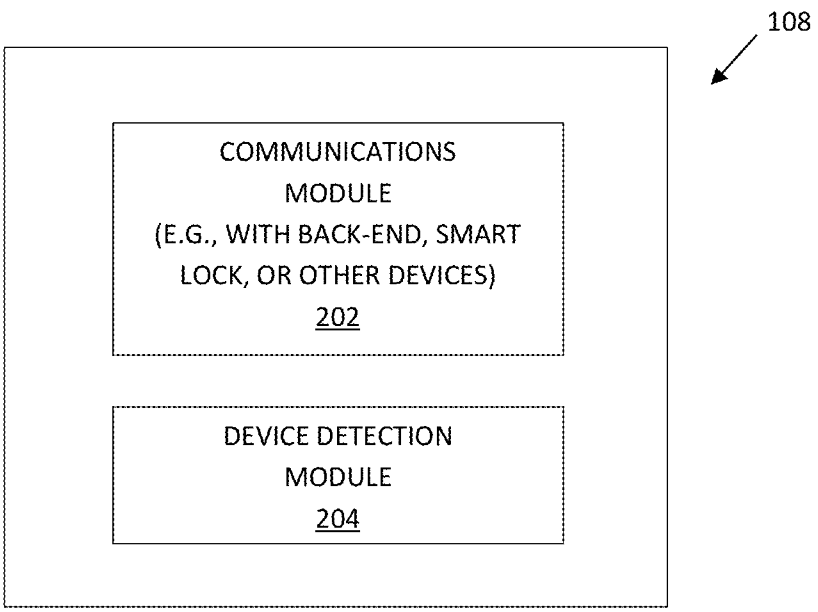
FIG. 2 is a block diagram of a set-back box, consistent with various embodiments.

An embodiment of an exemplary set-back box may be understood with reference to FIG. 2, a block diagram of a set-back box (e.g., set-back box 108). For example, the set-back box 108 may be a type of set-back-box that resides in the hotel room (or, for example, specific hotel room of a suite) to which the user checked-in. In another embodiment, the component 108 may be a set-top box having the same or similar features, structure, and functionalities. In another embodiment, the set-back box may comprise a set-top box. An exemplary set-back box may be the EVOLVE set-back box that is provided by DISH NETWORK CORP. (Englewood, Colo.). EVOLVE is an in-room hotel entertainment component that combines streaming apps, linear television and casting into a seamless, easy-to-manage solution. Presently, EVOLVE is a 4K-capable set-back box that is an information appliance device that generally contains a television tuner input and displays output to a television set or may be an external source of signal, converting the source signal into content in a form that can then be displayed on the television screen or other display device. As in EVOLVE, the set-back box 108 is integrated with the enterprise's property management system (PMS), offers UI personalization, and security (e.g., guest security). In other words, set-back box 108 may be an all-in-one commercial property television solution. Thus, in an embodiment, via back-end server 102, PMS transmits informational data about the user (e.g., guest) to set-back box 108, which set-back box 108 stores locally.

In an embodiment, an illustrative example of the set-top box may be the Hopper® set top box device available from DISH Network L.L.C. of Englewood, Colorado. Another example of the set-top box is the Joey® set top box device available from DISH Network L.L.C.

In an embodiment, set-back box 108 may be a small data box that stream content, like base system for a smart box for hotels. The set-back box 108 may require only one receiver and each independently receives messages from the property management system for each hotel room. For example, the set-back box 108 may be configured to receive informational data about who is registered to the room, the guest's name, and so on. Thus, in an embodiment, the whitelist of BLE addresses may be sent to the set-back boxes, such that when the user or the hotel guest comes closer to the hotel or the door, the corresponding BLE address of their mobile device is scanned by the set-back box. A device detection module 204 performs a check or a type of match, based on the whitelist and also the signal strength, e.g., how close the user is to the door. Then, based on that process, if the mobile device is close enough, the set-back box 108 may communicate, via communications module 202, with the smart lock 106, back-end server 102, mobile device 110, or other devices (e.g., a smart lamp or content player), each of which may be configured to perform further actions. In an embodiment, set-back box 108 is a hub that may talk or communicate with other Internet of Things (IoT) devices. In an embodiment, an IoT device may comprise a door lock (e.g., smart lock 106), which may be a standard black box smart lock device, and which may be configured to unlock the lock and possibly mechanism(s) necessary to open the door.

In an embodiment, device detection module 204 contains or is communicably connected to standard correlation algorithms that compute an object's distance based on its signal strength. The signal strength directly maps to the distance. Thus, such algorithms may compute, determine, and/or analyze a delta mapping between the signal strength emitted from an object (e.g., mobile device 110) and the distance to such object from where such emitted signal strength is captured (e.g., the set-back box 108). Such algorithms may be configured to account for large deviations or some entity which may deviate the signal. Thus, in an embodiment, by such algorithms enable the detection of mobile devices (e.g., mobile device 110).

In an embodiment, device detection module 204 contains a scanning processor that continually scans for beacons from mobile devices. For example, the scanner or scanning processor may scan or detect one or more BLE beacon(s) that is/are within a proximity to the set-back box 108. Thus, out of all the BLE addresses that the scanning processor detects, such scanning processer may be expressly configured to detect a particular mobile device 110, that is assigned to or associated with the structure (e.g., room).

In an embodiment, the mobile device is a device that is configured with a beacon generator facilitates the device being discoverable. For example, the device may be a BLE device that is configured with a button for a hotel staff member. In this way, set-back box 108 may be configured to learn that such device is within range (e.g., the hotel staff member has entered the room), based on detecting and measuring its signal strength. In an embodiment, the device is a BLE device with a BLE button. In an embodiment, and similar to above, the device may have an identifier and the set-back box 108 may be configured to pair the identifier with actionable items, such as for example, indicating to the back-end server 102 that the device (e.g., a hotel staff member) is present in a particular room. In an embodiment, such device may operate as a panic button. For example, if a hotel employee is in distress, the employee could press a button on the device, which may cause the device to be momentarily scanned again. That is, the device may be configured to publish red-alerts or other emergent notices. Based on the RSSI, the set-back box may detect if the employee is running away (from the set-back box). Thus, the set-back box 108, the mobile device 110, and the back-end server 102 may be configured to handle other situations.

In an embodiment, the set-back box 108 may be configured to detect the presence of the mobile device using a near-field connection (NFC) or other means that may be contemplated. In another embodiment, the enterprise may explicitly provide an application to the mobile device so that a message may be sent directly from the mobile device to the set-back box to unlock the door. For example, if the hands of a hotel guest are full and they want to open the door, the user (i.e., hotel guest) may preempt or anticipate such need and have configured the client application on their mobile device to unlock and possibly open the door, based on a proximity of their mobile device to the door. In an embodiment, the user may configure such command through a user interface to the back-end server 102.

Figure 3:
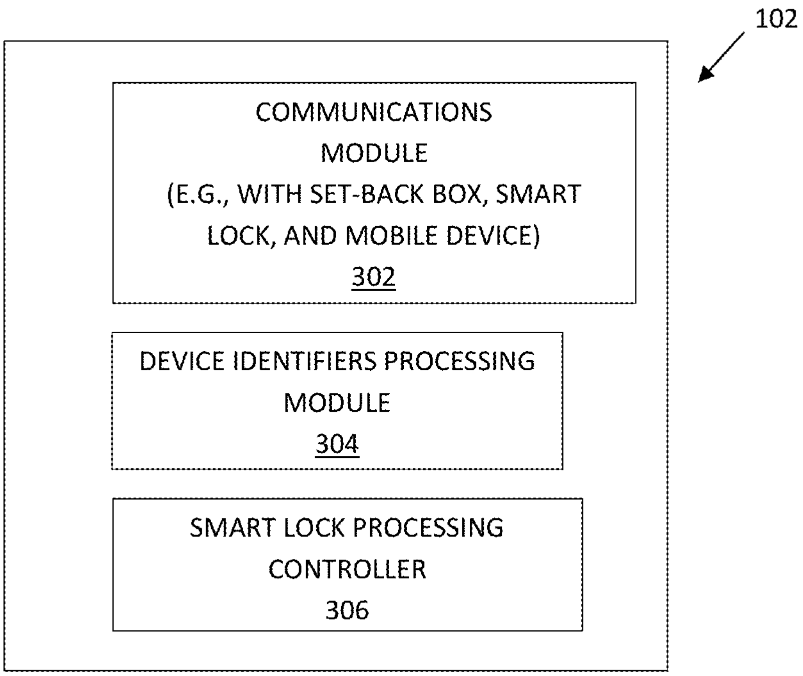
FIG. 3 is a block diagram of a back-end server, consistent with various embodiments.

An embodiment of a back-end server may be understood with reference to FIG. 3, a block diagram of a back-end server (e.g., back-end server 102). In an embodiment, in addition to other processing and storage functionalities, such as checking-in users, performing property management system operations, and the like, back-end server 102 contains a communications module 302, a device identifiers processing module 304, and/or a smart lock processing controller 306.

In an embodiment, device identifiers processing module 304 stores and pushes whitelist addresses of devices (e.g., mobile device 110). For example, in a hotel environment, after a hotel guest has checked-in to the hotel, device identifiers processing module 304 may receive an update to add a new device address to the whitelist. Device identifiers processing module 304 may send out an updated version of such whitelist to the interested set-back boxes of the hotel. In another example, device identifiers processing module 304 may transmit updated whitelists on a periodic basis or on a scheduled basis, such as every five minutes or every minute between noon and 5 pm, for example.

In an embodiment, back-end server 102 may revoke authorization of a device to cause the associated lock to unlock. For example, suppose a hotel guest loses their cell phone. The hotel guest may inform the hotel management, which may configure the back-end server 102 to activate a revoke process. For example, back-end server 102 may transmit a red flag type of notification or command to set-back box 108 to remove the identifier to mobile device 110 from its list. Or, back-end server 102 may transmit red flag type of updated whitelist (e.g., with the identifier of the compromised device omitted from the list) to set-back box 108 with a command to use such updated whitelist effective immediately. In another embodiment, smart lock processing controller 306 may be configured not to send an open lock command to the smart lock (e.g., smart lock 106) that is associated with the compromised device (e.g., mobile device 110).

In an embodiment, back-end server 102 may be configured to authorize multiple devices for one structure. For example, the back-end server of a hotel (e.g., back-end server 102) may be configured to add multiple devices to the whitelist. Further, set-back box 108 may be configured to scan for multiple devices and send a command to unlock the associated lock when any of such devices are detected to be in proximity. In an embodiment, the maximum number of authorized devices may be configured at the back-end server. For example, a hotel may designate the maximum number of mobile devices that may be authorized to unlock the door to the hotel room, based on the hotel's business criteria or physical limitations.

In an embodiment, the set-back box may be configured to perform customizations, personalization, specific actions, or local actions, based on a specific device identifier. Thus, for example, the system may know who is entering the room, based on the detection of the mobile device identifier. For example, based on the device identifier in proximity, a favorite TV channel may be switched to on the television screen or the thermostat may automatically set itself to a specific temperature. Such actions may be prioritized to avoid conflicting commands. For example, the favorite television channel of a parent may supersede the favorite television channel of a child, when both the corresponding, registered parent device and child device are in proximity to the set-back box (i.e., in the same hotel room).

In an embodiment, any combination of the components, back-end server 102, set-back box 108, mobile device 110, and smart lock 106, may be configured for notifications. That is, any component may be configured to transmit a notification message to any other component, depending on the situation. For instance, when more than one mobile device is registered to be associated with a set-back box in a hotel suite, when one mobile device enters the suite, the second mobile device may receive a notification that indicates that the first mobile device is now in the room. Similarly, the back-end server may be notified when one or more of the mobile devices enter or leave the room. Further, in an embodiment, a notification may indicate that an unrecognizable device has entered the room, thereby being informative from a security perspective. Further, a user may be notified when housekeeping has entered their room, e.g., for cleaning, or exited their room. In an embodiment, the system logs or tracks the device identifiers of entrances and exits of a room during the duration of the stay (e.g., in the hotel room).

In an embodiment, if one of the components (e.g., the set-back box 1080 experiences a failure or degradation, the mobile device 110 may be configured, such as through configured APIs, to receive a notification of such failure. Then, as an example, the hotel guest would use his physical key to unlock the lock and enter the hotel room.

Figure 4:
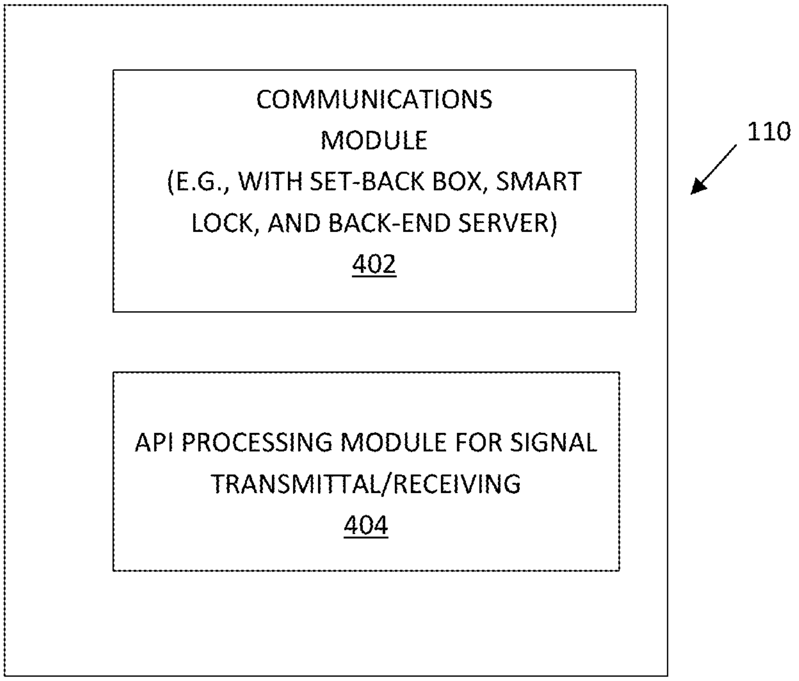
FIG. 4 is a block diagram of a mobile device, consistent with various embodiments.

An embodiment of a mobile device may be understood with reference to FIG. 4, a block diagram of a mobile device (e.g., mobile device 110). In an embodiment, mobile device 110 contains a communications module 402 configured for communicating with set-back box 108, smart lock 106, and/or back-end server 402. In an embodiment, mobile device 110 also contains an API processing module for signal (e.g., proprietary and/or using non-proprietary) transmittal/receiving 404, which enables mobile device 110 to communicate with an application controlled by back-end server 102. For example, mobile device 110 may be running a client application that communicates via certain APIs with a server application on back-end server 102. Such application may the user to check-in to the enterprise, such as allowing the hotel guest to check-in to the hotel. With such application, the mobile device 110 may not be required to obtain a barcode and subsequently have the barcode be scanned, as part of the check-in process. In an embodiment, such application may enable the identifier of the mobile device to be transmitted to or identified by the back-end server, such that such identifier may be subsequently pushed to set-back box for opening the lock, due to proximity of such identifier.

In an embodiment, the mobile device may be a smart phone, a smart watch, a tablet, or a BLE button.

In an embodiment, the enterprise (e.g., back-end server 102) provides APIs to the mobile device (e.g., mobile device 110), whereby a client application on the mobile device may be opened by a customer (e.g., a hotel guest) and kept running. Thus, when the customer goes inside the hotel, for example, the back-end server application learns from the client application that the customer is in proximity or has logged in.

In an embodiment, using the proprietary APIs, the user may send a specific BLE advertisement instead of standard BLE advertisements. In an embodiment, non-proprietary APIs may also be used or integrated. Thus, the user (e.g., hotel guest) may send a specific BLE advertisement that the set-back box 108 may detect. Such specific or private beacon may allow for private hotel network functionality. For instance, housekeeping, through their mobile device, may trigger a specific channel to play on the television, such as a training channel that explains the cleaning tasks that need to be done in the room. The set-back box 108 may be configured to recognize and act on the receipt of such specific beacon, that may otherwise be undetected by other scanners or applications. In an embodiment, the mobile device 110 may be configured to communicate with the back-end server 102 or directly to the set-back box 108 to add another device to the structure or room, such as by using the proprietary beacon directly to the set-back box 108 or by communicating with the back-end server 102, such as by using the application on the mobile device 110 or via some other interface.

Figure 5:
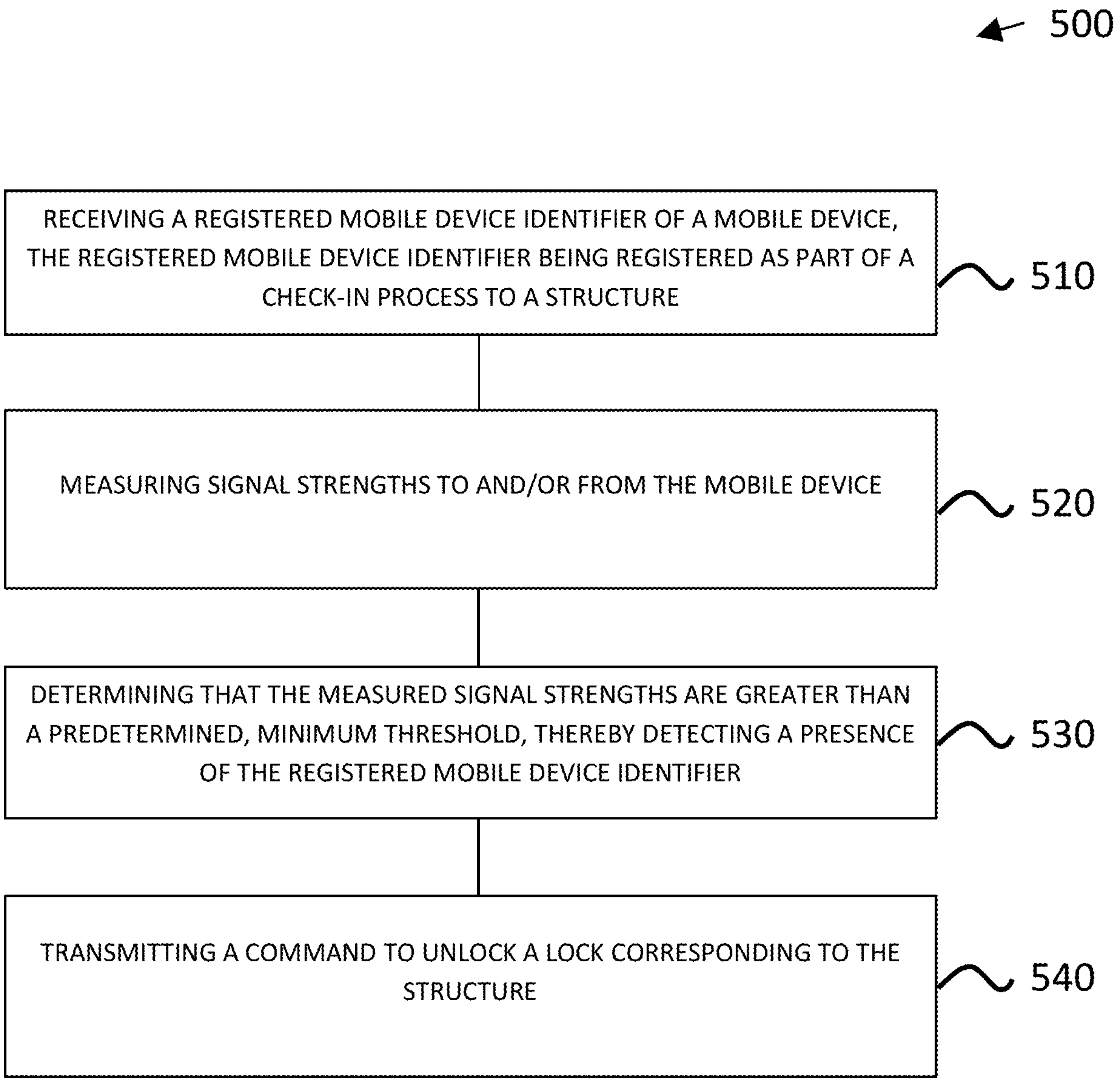
FIG. 5 is a flow diagram showing keyless entry, utilizing a set-back box, from the perspective of the set-back box, consistent with various embodiments.

An embodiment may be understood with reference to FIG. 5, a flow diagram showing keyless entry, utilizing a set-back box, from the perspective of the set-back box. The method 500 may be performed by a set-back box, such as the set-back box 108 of FIG. 1.

At step 510, the method 500 includes receiving (e.g., from the back-end server 102 or, possibly, from the mobile device 110, itself) a registered mobile device identifier of a mobile device (e.g., mobile device 110), the registered mobile device identifier being registered as part of a check-in process (e.g., via back-end server 102) to a structure. In an embodiment, the registered mobile device identifier is received in a whitelist of device identifiers or device addresses. In an embodiment, the registered mobile device identifier is stored in a local storage of set-back box 108.

At step 520, the method 500 includes measuring (e.g., by set-back box 108) signal strengths to or from the mobile device (e.g., mobile device 110).

At step 530, the method 500 includes determining (e.g., by set-back box 108) that the measured signal strengths are greater than a predetermined, minimum threshold, thereby detecting a presence of the registered mobile device identifier (e.g., that of mobile device 110).

At step 540, the method 500 includes transmitting (e.g., by set-back box 108) a command to unlock a lock corresponding to the structure (e.g., to back-end server 102 or directly to smart lock 106).

Figure 6:
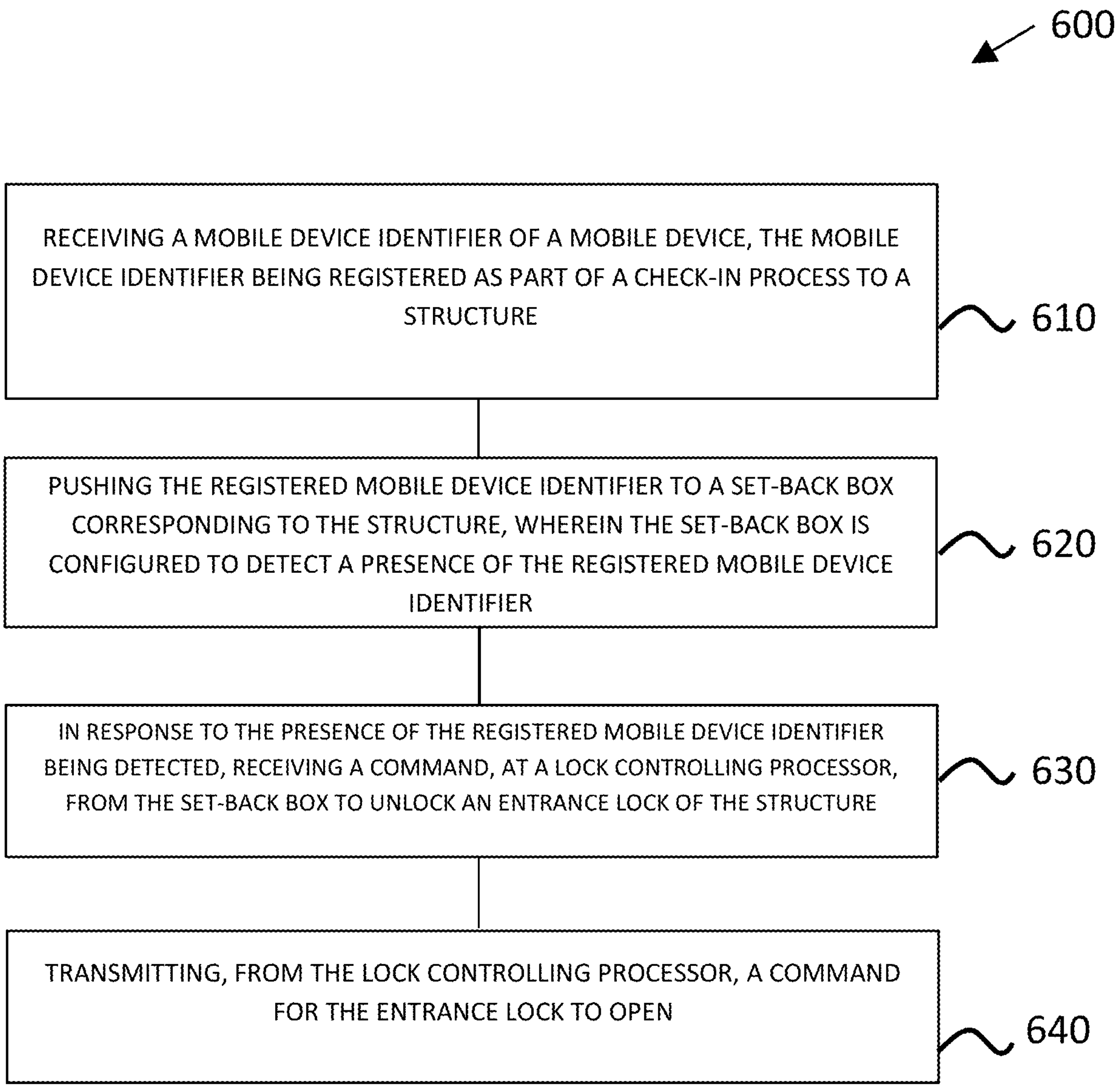
FIG. 6 is a flow diagram showing keyless entry, utilizing a set-back box, from the perspective of the back-end server, consistent with various embodiments.

An embodiment may be understood with reference to FIG. 6, a flow diagram showing keyless entry, utilizing a set-back box, from the perspective of the back-end server. The method 600 may be performed on a back-end server, such as back-end server 102 of FIG. 1.

At step 610, the method 600 includes receiving (e.g., at back-end server 102) a mobile device identifier of a mobile device (e.g., mobile device 110), the mobile device identifier being registered as part of a check-in process to a structure.

At step 620, the method 600 includes pushing (e.g., by back-end server 102) the registered mobile device identifier to a set-back box (e.g., set-back box 108) corresponding to the structure, wherein the set-back box is configured to detect a presence of the registered mobile device identifier (e.g., that of mobile device 110).

At step 630, the method 600 includes in response to the presence of the registered mobile device identifier (e.g., that of mobile device 110) being detected (e.g., by set-back box 108), receiving (e.g., at back-end server 102) a command, at a lock controlling processor (e.g., smart lock processing controller 306), from the set-back box (e.g., by set-back box 108) to unlock an entrance lock (e.g., smart lock 106) of the structure.

At step 640, the method 600 includes transmitting, from the lock controlling processor (e.g., smart lock processing controller 306), a command for the entrance lock (e.g., smart lock 106) to open.

Figure 7:
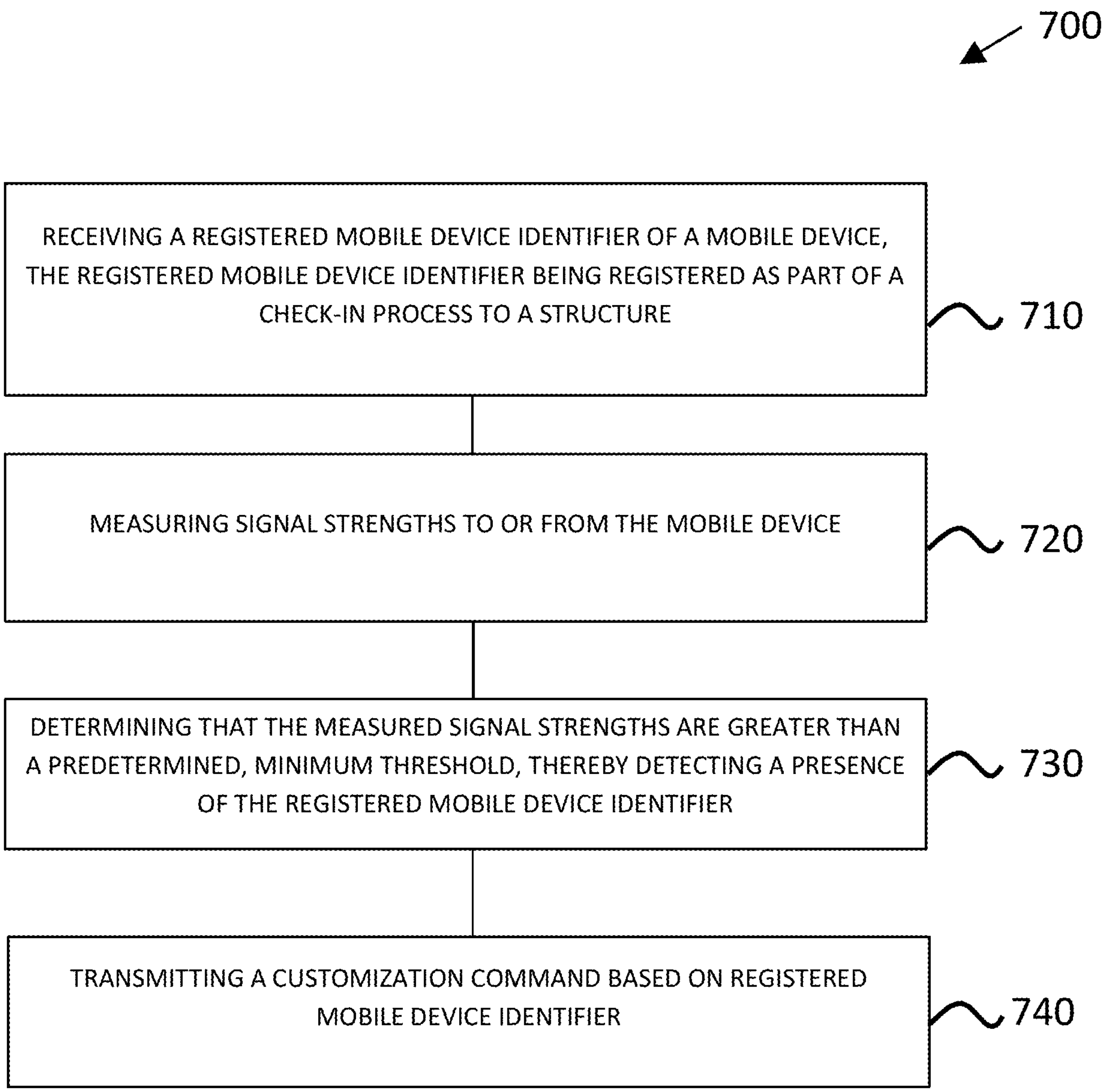
FIG. 7 is a flow diagram showing mobile device enabled personalization, utilizing a set-back box, from the perspective of the back-end server, consistent with various embodiments.

An embodiment may be understood with reference to FIG. 7, a flow diagram showing mobile device enabled personalization, utilizing a set-back box. The method 700 may be performed on a set-back box, such as the set-back box 108 of FIG. 1.

At step 710, the method 700 includes receiving (e.g., by set-back box 108) a registered mobile device identifier of a mobile device (e.g., mobile device 110), the registered mobile device identifier (e.g., of mobile device 110) being registered as part of a check-in process (e.g., via back-end server 102) to a structure.

At step 720, the method 700 includes measuring (e.g., by set-back box 108) signal strengths to or from the mobile device (e.g., mobile device 110).

At step 730, the method 700 includes determining (e.g., by set-back box 108) that the measured signal strengths (e.g., to or from mobile device 110) are greater than a predetermined, minimum threshold (e.g., stored locally on set-back box or stored on back-end server 102), thereby detecting (e.g., to or from mobile device 110 or by back-end server 102 if signal strengths are transmitted thereto) a presence of the registered mobile device identifier (e.g., that of mobile device 110).

At step 730, the method 700 includes transmitting (e.g., by set-back box 108) a customization command (e.g., to turn lights on, to turn television on to a particular channel, or to play certain music) based on the registered mobile device identifier (e.g., that of mobile device 110).

Figure 8:
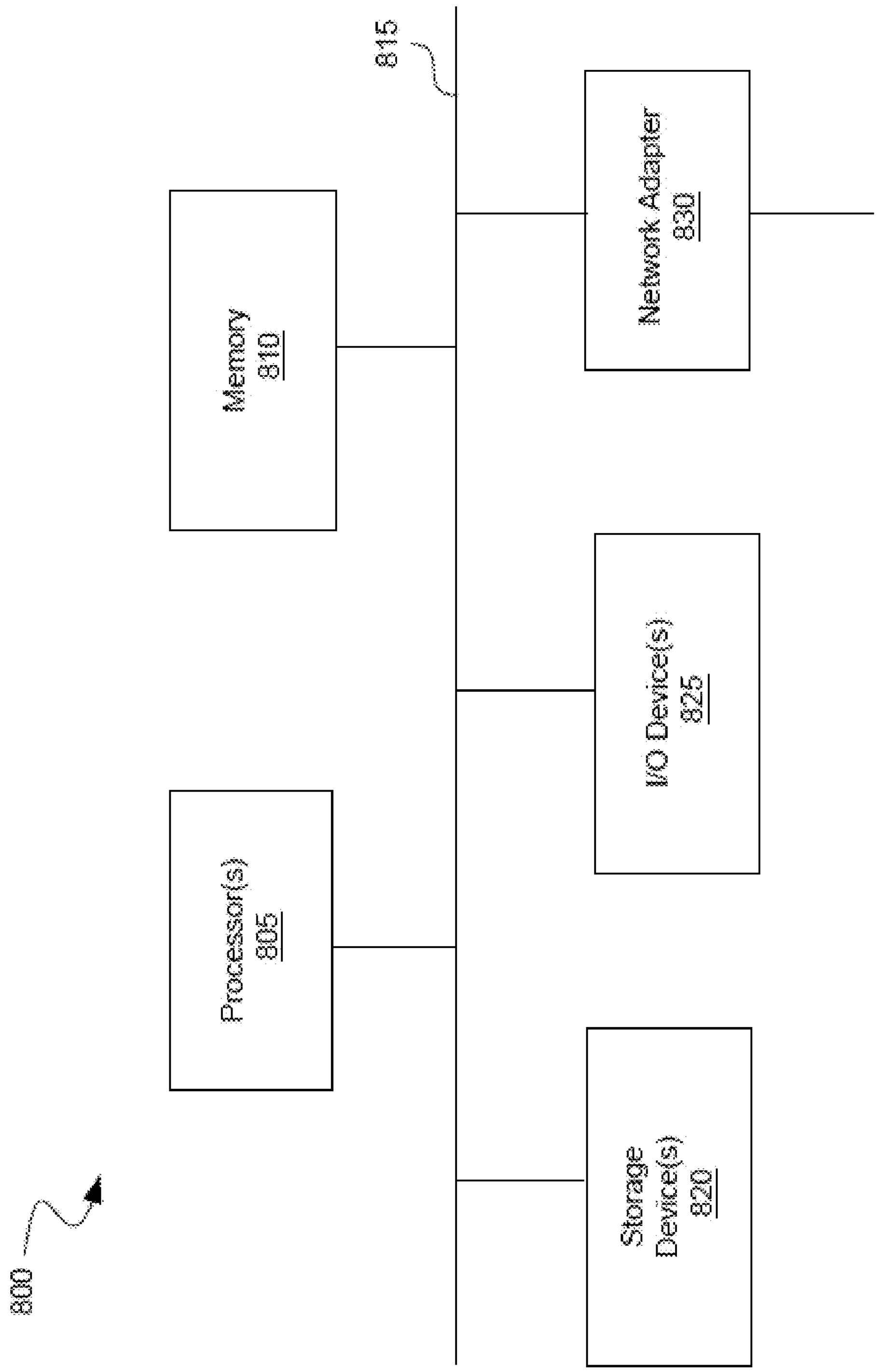
FIG. 8 is a block diagram of a processing system that can implement operations, consistent with various embodiments.

FIG. 8 is a block diagram of a computer system as may be used to implement features of the disclosed embodiments. The computing system 800 may be used to implement any of the entities, components, modules, systems, or services depicted in the examples of the foregoing figures (and any other entities described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI)

bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method, comprising:

receiving, at a set-back box and from a backend server, a registered mobile device identifier and a low-energy address for a low-energy network, of a mobile device, the registered mobile device identifier and low-energy address both being registered as part of a check-in process to a room, wherein the registered mobile device identifier and the low-energy address are received from the backend server in a list of a plurality of registered mobile device identifiers and low-energy addresses, wherein the mobile device identifier and low-energy address are stored in a local storage of the set-back box, and wherein each other identifier and low-energy address is associated with each of a plurality of other rooms;

wherein the set-back box is an in-room entertainment component;

measuring, by the set-back box over the low-energy network and using the low-energy address from the local storage, signal strengths to or from the mobile device, from or to the set-back box, respectively;

determining, by the set-back box, that the measured signal strengths are greater than a predetermined, minimum threshold, and subsequently detecting a presence of the registered mobile device identifier; and transmitting, by the set-back box, a command to unlock a lock corresponding to the room.

2. The method of claim 1, wherein the mobile device identifier is a mobile device address.

3. The method of claim 2, wherein the mobile device address is a Bluetooth low energy address.

4. The method of claim 1, wherein the check-in process takes place at a hotel.

5. The method of claim 1, further comprising:

actively scanning, using a scanning processor, signal strengths of identifiers of devices in Bluetooth low energy protocol.

6. The method of claim 1, wherein the presence is detected when signal strengths to and from the mobile device are measured as greater than a predetermined, minimum threshold.

7. The method of claim 6, wherein the signal strengths are implemented as received signal strength indicator (RSSI) levels.

8. The method of claim 1, wherein the received mobile device identifier and low-energy address are encrypted.

9. The method of claim 1, further comprising:
receiving customization parameters associated with the registered mobile device identifier and subsequently performing actions corresponding to the customization parameters.

10. The method of claim 1, wherein the command for the entrance lock to open includes a command to automatically open the entrance door.

11. The method of claim 1, further comprising:
receiving a second mobile device identifier and a second low-energy address and storing the second mobile device identifier and second low-energy address in the local storage;
utilizing the second mobile device identifier and second low-energy address from the local storage to detect a presence of the second mobile device;
transmitting, in response to the detection of the presence of the second mobile device, a command to unlock the entrance lock of the room.

12. A method, comprising:
receiving, at a backend server, a signal indicating the registration of a mobile device identifier and a low-energy address for a low-energy network of a mobile device, as part of a check-in process to a room;
receiving, at the backend server, the mobile device identifier and the low-energy address of the mobile device;
pushing, by the backend server, the registered mobile device identifier and the low-energy address in a list of a plurality of registered mobile device identifiers and low-energy addresses, each other identifier and low-energy address associated with a plurality of other rooms, to a set-back inside the room, wherein the set-back box is configured to store the registered mobile device identifier and the low-energy address in a local storage to detect a presence of the registered mobile device identifier over the low-energy network and using the low-energy address from the local storage and wherein the set-back box is an in-room entertainment component;
in response to the presence of the registered mobile device identifier being detected, transmitting a command for delivery at a lock controlling processor, from the set-back box to unlock an entrance lock of the room; and
causing, by the command, transmitting, from the lock controlling processor, a command for the entrance lock to open.

13. The method of claim 12, wherein the set-back box is Bluetooth low energy (BLE) enabled and actively scans identifiers from BLE-enabled mobile devices.

14. The method of claim 12, further comprising:
receiving a request to enable a second mobile device identifier to unlock the entrance lock;
pushing the second mobile device identifier and a second low-energy address to the set-back box for the local storage, causing the set-back box to detect presence of the second mobile device identifier;
receiving, in response to the detection of the presence of the second mobile device identifier, a command, at the lock controlling processor, from the set-back box, to unlock the entrance lock of the room; and
transmitting, from the lock controlling processor, a command for the entrance lock to open.

15. A method, comprising:
receiving, at a set-back box and from a backend server, a registered mobile device identifier and a low-energy address for a low-energy network, of a mobile device, the registered mobile device identifier and low-energy address both being registered as part of a check-in process to a room, wherein the registered mobile device identifier and the low-energy address are is received from the backend server in a list of a plurality of registered mobile device identifiers and low-energy addresses, wherein the mobile device identifier and low-energy address are stored in a local storage of the set-back box, and wherein each other identifier and low-energy address is associated with each of a plurality of other rooms;
wherein the set-back box is an in-room entertainment component;
measuring, by the set-back box over the low-energy network and using the low-energy address from the local storage, signal strengths to or from the mobile device, from or to the set-back box, respectively;
determining, by the set-back box, that the measured signal strengths are greater than a predetermined, minimum threshold, and subsequently detecting a presence of the registered mobile device identifier; and
transmitting, by the set-back box, a customization command to configurable objects in the room, based on registered mobile device identifier.

16. The method of claim 15, wherein the customization command is a notification that another identifier has entered or exited the room.

17. The method of claim 15, further comprising:
receiving, from the mobile device, a specific signal, wherein the specific signal is in accordance with a proprietary protocol, supported by an application program interface executed by the mobile device; and
performing one or more predetermined actions based on the specific signal.

* * * * *